US010609160B2

(12) United States Patent
Poon et al.

(10) Patent No.: US 10,609,160 B2
(45) Date of Patent: Mar. 31, 2020

(54) PERFORMING CONTEXT-RICH ATTRIBUTE-BASED SERVICES ON A HOST

(71) Applicant: Nicira, Inc., Palo Alto, CA (US)

(72) Inventors: Arnold Poon, San Mateo, CA (US); Laxmikant Gunda, Pune (IN); Jayant Jain, Cupertino, CA (US); Anirban Sengupta, Saratoga, CA (US); Sachin Mohan Vaidya, Pune (IN)

(73) Assignee: NICIRA, INC., Palo Alto, CA (US)

( * ) Notice: Subject to any disclaimer, the term of this patent is extended or adjusted under 35 U.S.C. 154(b) by 235 days.

(21) Appl. No.: 15/830,086

(22) Filed: Dec. 4, 2017

(65) Prior Publication Data
US 2018/0159943 A1 Jun. 7, 2018

(30) Foreign Application Priority Data

Dec. 6, 2016 (IN) .............................. 201641041697
Dec. 16, 2016 (IN) .............................. 201641043081

(51) Int. Cl.
| | |
|---|---|
| *G06F 15/173* | (2006.01) |
| *H04L 29/08* | (2006.01) |
| *H04L 29/06* | (2006.01) |
| *H04L 12/24* | (2006.01) |
| *G06F 9/448* | (2018.01) |
| *H04L 12/26* | (2006.01) |

(52) U.S. Cl.
CPC ............ *H04L 67/16* (2013.01); *G06F 9/4494* (2018.02); *H04L 41/046* (2013.01); *H04L 41/0816* (2013.01); *H04L 41/0846* (2013.01); *H04L 43/028* (2013.01); *H04L 67/327* (2013.01); *H04L 69/22* (2013.01); *H04L 63/0263* (2013.01)

(58) Field of Classification Search
CPC ..... H04L 67/16; H04L 67/327; H04L 41/046; H04L 41/0816; H04L 41/0846; H04L 43/028; H04L 69/22; H04L 63/0263; G06F 9/4494
USPC .......................................................... 709/223
See application file for complete search history.

(56) References Cited

U.S. PATENT DOCUMENTS

| | | | |
|---|---|---|---|
| 5,826,051 | A | 10/1998 | Porter et al. |
| 5,950,195 | A | 9/1999 | Stockwell et al. |
| 6,363,477 | B1 | 3/2002 | Fletcher et al. |

(Continued)

FOREIGN PATENT DOCUMENTS

| | | |
|---|---|---|
| EP | 2748750 A1 | 7/2014 |
| WO | 2008095010 A1 | 8/2008 |

(Continued)

OTHER PUBLICATIONS

Author Unknown, "CISCO Identity-Based Firewall Security," Month Unknown 2011, 2 pages, CISCO Systems, Inc.

(Continued)

*Primary Examiner* — Wing F Chan
*Assistant Examiner* — Joseph R Maniwang
(74) *Attorney, Agent, or Firm* — Adeli LLP

(57) ABSTRACT

Some embodiments provide a novel method for performing a service at a host computer that executes data compute nodes (DCNs). For a data message, the method identifies a service tag and a set of attributes associated with the service tag. The method then uses the identified set of attributes to identify a service rule, and performs a service on the data message based on the identified service rule.

20 Claims, 7 Drawing Sheets

(56) References Cited

U.S. PATENT DOCUMENTS

| | | |
|---|---|---|
| 6,430,188 B1 | 8/2002 | Kadambi et al. |
| 6,496,935 B1 | 12/2002 | Fink et al. |
| 6,781,990 B1 | 8/2004 | Puri et al. |
| 6,880,089 B1 | 4/2005 | Bommareddy et al. |
| 7,055,173 B1 | 5/2006 | Chaganty et al. |
| 7,349,382 B2 | 3/2008 | Marimuthu et al. |
| 7,543,054 B1 | 6/2009 | Bansod et al. |
| 7,639,613 B1 | 12/2009 | Ghannadian et al. |
| 7,818,452 B2 | 10/2010 | Matthews et al. |
| 7,843,843 B1 | 11/2010 | Papp, III et al. |
| 7,948,986 B1 | 5/2011 | Ghosh et al. |
| 8,031,599 B2 | 10/2011 | Duffield et al. |
| 8,032,933 B2 | 10/2011 | Turley et al. |
| 8,190,767 B1 | 5/2012 | Maufer et al. |
| 8,365,294 B2 | 1/2013 | Ross |
| 8,381,209 B2 | 2/2013 | Reumann et al. |
| 8,484,739 B1 | 7/2013 | Seshadri |
| 8,655,307 B1 | 2/2014 | Walker et al. |
| 8,660,129 B1 | 2/2014 | Brendel et al. |
| 8,953,453 B1 | 2/2015 | Xiao et al. |
| 9,015,823 B2 | 4/2015 | Koponen et al. |
| 9,215,214 B2 | 12/2015 | Bansal et al. |
| 9,317,696 B2 | 4/2016 | Ayres et al. |
| 9,413,667 B2 | 8/2016 | Beliveau et al. |
| 9,444,841 B2 | 9/2016 | Feroz et al. |
| 9,565,202 B1 | 2/2017 | Kindlund et al. |
| 9,596,135 B1 | 3/2017 | Thomas et al. |
| 9,762,619 B1 | 9/2017 | Vaidya et al. |
| 9,891,940 B2 | 2/2018 | Feroz et al. |
| 9,948,611 B2 | 4/2018 | Kumar et al. |
| 9,996,697 B2 | 6/2018 | Mahaffey et al. |
| 10,033,693 B2 | 7/2018 | Sengupta et al. |
| 10,324,746 B2 | 6/2019 | Kumar et al. |
| 10,333,983 B2 | 6/2019 | Vaidya et al. |
| 2002/0116523 A1 | 8/2002 | Warrier et al. |
| 2002/0122422 A1 | 9/2002 | Kenney et al. |
| 2003/0005118 A1 | 1/2003 | Williams |
| 2003/0093481 A1 | 5/2003 | Mitchell et al. |
| 2003/0093672 A1 | 5/2003 | Cichowlas |
| 2004/0049701 A1 | 3/2004 | Pennec et al. |
| 2004/0098620 A1 | 5/2004 | Shay |
| 2004/0117407 A1 | 6/2004 | Kumar et al. |
| 2004/0162901 A1 | 8/2004 | Mangipudi et al. |
| 2005/0114711 A1 | 5/2005 | Hesselink et al. |
| 2005/0198125 A1 | 9/2005 | Beck et al. |
| 2005/0257244 A1 | 11/2005 | Joly et al. |
| 2005/0286457 A1 | 12/2005 | Foster et al. |
| 2006/0092861 A1 | 5/2006 | Corday et al. |
| 2007/0061492 A1 | 3/2007 | Riel |
| 2007/0143851 A1 | 6/2007 | Nicodemus et al. |
| 2008/0059474 A1 | 3/2008 | Lim |
| 2008/0072305 A1 | 3/2008 | Casado et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2008/0301630 A1 | 12/2008 | Arnold et al. |
| 2008/0316922 A1 | 12/2008 | Riddle et al. |
| 2008/0320550 A1 | 12/2008 | Strassner et al. |
| 2009/0007251 A1 | 1/2009 | Abzarian et al. |
| 2009/0055427 A1 | 2/2009 | Kulasingam et al. |
| 2009/0070442 A1 | 3/2009 | Kacin et al. |
| 2009/0129271 A1 | 5/2009 | Ramankutty et al. |
| 2009/0150521 A1 | 6/2009 | Tripathi |
| 2009/0178061 A1 | 7/2009 | Sandoval et al. |
| 2009/0187963 A1 | 7/2009 | Bori |
| 2009/0193497 A1 | 7/2009 | Kikuchi et al. |
| 2009/0228951 A1 | 9/2009 | Ramesh et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0281996 A1 | 11/2009 | Liu et al. |
| 2009/0327781 A1 | 12/2009 | Tripathi |
| 2010/0037311 A1 | 2/2010 | He et al. |
| 2010/0100616 A1 | 4/2010 | Bryson et al. |
| 2010/0125667 A1 | 5/2010 | Soundararajan |
| 2010/0138515 A1 | 6/2010 | Ruiz-Velasco et al. |
| 2010/0228819 A1 | 9/2010 | Wei |
| 2011/0016467 A1 | 1/2011 | Kane |
| 2011/0022695 A1 | 1/2011 | Dalal et al. |
| 2011/0055848 A1 | 3/2011 | Vainionpää et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0238581 A1 | 9/2011 | Severson et al. |
| 2011/0246637 A1 | 10/2011 | Murakami |
| 2012/0240182 A1 | 9/2012 | Narayanaswamy et al. |
| 2012/0317570 A1 | 12/2012 | Dalcher et al. |
| 2013/0007740 A1 | 1/2013 | Kikuchi et al. |
| 2013/0007879 A1 | 1/2013 | Esteban et al. |
| 2013/0013669 A1 | 1/2013 | Chun et al. |
| 2013/0018994 A1 | 1/2013 | Flavel et al. |
| 2013/0019276 A1 | 1/2013 | Biazetti et al. |
| 2013/0073743 A1 | 3/2013 | Ramasamy et al. |
| 2013/0085880 A1 | 4/2013 | Roth et al. |
| 2013/0163594 A1 | 6/2013 | Sharma et al. |
| 2013/0205366 A1 | 8/2013 | Luna et al. |
| 2013/0219176 A1 | 8/2013 | Akella et al. |
| 2013/0227097 A1 | 8/2013 | Yasuda et al. |
| 2013/0227550 A1 | 8/2013 | Weinstein et al. |
| 2013/0268751 A1 | 10/2013 | Preiss et al. |
| 2013/0332983 A1 | 12/2013 | Koorevaar et al. |
| 2014/0007222 A1 | 1/2014 | Qureshi et al. |
| 2014/0020045 A1 | 1/2014 | Kabat et al. |
| 2014/0040182 A1 | 2/2014 | Gilder et al. |
| 2014/0059163 A1 | 2/2014 | Herbrich et al. |
| 2014/0067779 A1 | 3/2014 | Ojha |
| 2014/0068602 A1 | 3/2014 | Gember et al. |
| 2014/0115578 A1 | 4/2014 | Cooper et al. |
| 2014/0136681 A1 | 5/2014 | Greenlee et al. |
| 2014/0173624 A1 | 6/2014 | Kurabayashi |
| 2014/0195666 A1 | 7/2014 | Dumitriu et al. |
| 2014/0215226 A1 | 7/2014 | Litty et al. |
| 2014/0230008 A1 | 8/2014 | Feroz et al. |
| 2014/0237119 A1 | 8/2014 | Chung et al. |
| 2014/0281030 A1 | 9/2014 | Cui et al. |
| 2014/0282539 A1 | 9/2014 | Sonnek |
| 2014/0282855 A1 | 9/2014 | Clark et al. |
| 2015/0012964 A1 | 1/2015 | Xie et al. |
| 2015/0096007 A1 | 4/2015 | Sengupta et al. |
| 2015/0106438 A1 | 4/2015 | Fan et al. |
| 2015/0134822 A1 | 5/2015 | Bhagwat et al. |
| 2015/0154293 A1 | 6/2015 | Lu |
| 2015/0169345 A1 | 6/2015 | DeCusatis et al. |
| 2015/0172208 A1 | 6/2015 | DeCusatis et al. |
| 2015/0269383 A1 | 9/2015 | Lang et al. |
| 2015/0350807 A1 | 12/2015 | Andrews et al. |
| 2015/0358344 A1 | 12/2015 | Mumcuoglu et al. |
| 2016/0057167 A1 | 2/2016 | Bach |
| 2016/0087905 A1 | 3/2016 | Liu et al. |
| 2016/0119194 A1 | 4/2016 | Lopez et al. |
| 2016/0173329 A1 | 6/2016 | Latham et al. |
| 2016/0191413 A1 | 6/2016 | Feroz et al. |
| 2016/0191521 A1 | 6/2016 | Feroz et al. |
| 2016/0212167 A1 | 7/2016 | Dotan et al. |
| 2016/0232024 A1 | 8/2016 | Hamilton et al. |
| 2016/0234250 A1 | 8/2016 | Ashley et al. |
| 2016/0294923 A1 | 10/2016 | Fan et al. |
| 2017/0063883 A1 | 3/2017 | Martinez |
| 2017/0063903 A1 | 3/2017 | Muddu et al. |
| 2017/0093664 A1 | 3/2017 | Lynam et al. |
| 2017/0099197 A1* | 4/2017 | Raney .................. H04L 43/028 |
| 2017/0126494 A1 | 5/2017 | Kumar et al. |
| 2017/0170990 A1 | 6/2017 | Gaddehosur et al. |
| 2017/0171159 A1 | 6/2017 | Kumar et al. |
| 2017/0230419 A1 | 8/2017 | Prafullchandra et al. |
| 2017/0264628 A1 | 9/2017 | Treat et al. |
| 2017/0302685 A1 | 10/2017 | Ladnai et al. |
| 2017/0317978 A1 | 11/2017 | Diaz-Cuellar et al. |
| 2018/0063194 A1 | 3/2018 | Vaidya et al. |
| 2018/0103011 A1 | 4/2018 | Li et al. |
| 2018/0159733 A1 | 6/2018 | Poon et al. |
| 2018/0181423 A1 | 6/2018 | Gunda et al. |
| 2018/0181754 A1 | 6/2018 | Gunda |
| 2018/0181763 A1 | 6/2018 | Gunda |

(56) References Cited

U.S. PATENT DOCUMENTS

| | | |
|---|---|---|
| 2018/0183759 A1 | 6/2018 | Gunda et al. |
| 2018/0183761 A1 | 6/2018 | Gunda et al. |
| 2018/0183764 A1 | 6/2018 | Gunda |
| 2018/0183866 A1 | 6/2018 | Gunda et al. |
| 2018/0191763 A1 | 7/2018 | Hillard et al. |
| 2018/0241761 A1 | 8/2018 | Bania et al. |
| 2018/0351912 A1 | 12/2018 | Sengupta et al. |
| 2019/0034454 A1 | 1/2019 | Gangumalla et al. |
| 2019/0036956 A1 | 1/2019 | Gunda et al. |
| 2019/0149525 A1 | 5/2019 | Gunda et al. |
| 2019/0235934 A1 | 8/2019 | Chanda et al. |
| 2019/0238429 A1 | 8/2019 | Chanda et al. |
| 2019/0266004 A1 | 8/2019 | Kumar et al. |

FOREIGN PATENT DOCUMENTS

| | | |
|---|---|---|
| WO | 2013074828 A1 | 5/2013 |
| WO | 2014126574 A1 | 8/2014 |
| WO | 2018044352 A1 | 3/2018 |
| WO | 2018106612 A1 | 6/2018 |
| WO | 2018118465 A1 | 6/2018 |

OTHER PUBLICATIONS

Author Unknown, "Enabling Service Chaining on Cisco Nexus 1000V Series," Month Unknown, 2012, 25 pages, CISCO.

Author Unknown, "Next-Generation Firewalls," Month Unknown 2013, 1 page, Palo Alto Networks.

Basak, Debashis, et al., "Virtualizing Networking and Security in the Cloud," Month Unknown 2010, 9 pages, VMware, Inc., Palo Alto, CA.

Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011.

Guichard, J., et al., "Network Service Chaining Problem Statement," Network Working Group, Jun. 13, 2013, 14 pages, Cisco Systems, Inc.

Ioannidis, Sotiris, et al., "Implementing a Distributed Firewall," CCS '00, Month Unknown 2000, 10 pages, ACM, Athens, Greece.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Moshref, Masoud, et al., "vCRIB: Virtualized Rule Management in the Cloud," HotCloud'12, Jun. 12-13, 2012, 6 pages.

PCT International Search Report and Written Opinion dated May 22, 2018 for commonly owned International Patent Application PCT/US17/064557, 12 pages, Nicira, Inc.

Rubino, Roberto D., "An Open System for Transparent Firewall Authentication and User Traffic Identification within Corporate Intranets," SIGITE '08, Oct. 16-18, 2008, 5 pages, ACM, Cincinnati, OH, USA.

Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.

Schulz-Zander, Julius, et al., "Realizing Software-Defined Wireless Networks: Acheiving Fine-Grained Wi-Fi Programmability with Off-the-Shelf Hardware," Apr. 20, 2016, 126 pages.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Stojanovski, Nenad, et al., "Analysis of Identity Based Firewall Systems," Jun. 2010, 9 pages.

Stojanovski, Nenad, et al., "Architecture of a Identity Based Firewall System," Jul. 2011, 9 pages.

Brownlee, N., et al., "Traffic Flow Measurement: Architecture," RFC 2722, Oct. 1999, 48 pages, The Internet Society.

Deri, Luca, et al., "nDPI: Open-Source High-Speed Deep Packet Inspection," 2014 International Wireless Communications and Mobile Computing Conference (IWCMC), Aug. 4-8, 2014, 6 pages, IEEE, Nicosia, Cyprus.

Nance, Kara, et al., "Virtual Machine Introspection: Obeservation or Interference?," IEEE Security and Privacy, Sep. 1, 2008, 6 pages, vol. 6, No. 5, IEEE Service Center, Los Alamitos, CA, US.

Flegkas, Paris, et al., "On Policy-Based Extensible Hierarchical Network Management in QoS-Enabled IP Networks," Policy '01 Proceedings of the International Workshop on Policies for Distributed Systems and Networks, Jan. 29-31, 2011, 17 pages, Spring-Verlag, London, UK.

Non-Published commonly Owned U.S. Appl. No. 15/650,251, filed Jul. 14, 2017, 91 pages, Nicira, Inc.

Non-Published commonly Owned U.S. Appl. No. 15/650,294, filed Jul. 14, 2017, 90 pages, Nicira, Inc.

Non-Published commonly Owned U.S. Appl. No. 15/650,340, filed Jul. 14, 2017, 90 pages, Nicira, Inc.

Non-Published commonly Owned U.S. Appl. No. 15/796,875, filed Oct. 30, 2017, 88 pages, Nicira, Inc.

Non-Published commonly Owned U.S. Appl. No. 15/830,074, filed Dec. 4, 2017, 40 pages, Nicira, Inc.

Non-Published commonly Owned U.S. Appl. No. 15/896,099, filed Feb. 14, 2018, 58 pages, Nicira, Inc.

Non-Published commonly Owned U.S. Appl. No. 15/836,888, filed Dec. 10, 2017, 59 pages, Nicira, Inc.

Non-Published commonly Owned U.S. Appl. No. 15/836,892, filed Dec. 10, 2017, 48 pages, Nicira, Inc.

Non-Published commonly Owned U.S. Appl. No. 15/847,898, filed Dec. 19, 2017, 50 pages, Nicira, Inc.

Non-Published commonly Owned U.S. Appl. No. 15/847,908, filed Dec. 19, 2017, 58 pages, Nicira, Inc.

Non-Published commonly Owned U.S. Appl. No. 15/881,639, filed Jan. 26, 2018, 34 pages, Nicira, Inc.

Non-Published commonly Owned U.S. Appl. No. 15/881,645, filed Jan. 26, 2018, 34 pages, Nicira, Inc.

Non-Published Commonly Owned International Patent Application PCT/US17/64557, filed Dec. 4, 2017, 39 pages, Nicira, Inc.

\* cited by examiner

PERFORMING CONTEXT-RICH ATTRIBUTE-BASED SERVICES ON A HOST

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts. Most of these middlebox solutions, however, do not take advantage of the rich-contextual data that can be captured for each data message flow on the host. One reason for this is that existing techniques do not provide an efficient, distributed scheme for filtering the thousands of captured-contextual attributes in order to efficiently process service rules that are defined in terms of much smaller sets of contextual attributes.

BRIEF SUMMARY

Some embodiments provide a novel method for configuring a set of one or more service nodes on a host to perform context-rich, attribute-based services on the host computer, which executes several data compute nodes (DCNs) in addition to the set of service nodes. The method uses a context-filtering node on the host to collect a first set of attributes associated with service rules processed by the set of service nodes on the host computer. The context filter also collects a second set of attributes associated with at least one data message flow of a DCN (e.g., of a virtual machine (VM) or container) executing on the host. In some embodiments, the first and second sets of attributes are not L2-L4 header parameters. For instance, in some embodiments, these sets of attributes include L7 parameters or group identifiers (e.g., network security group identifiers). Also, in some embodiments, each service rule includes a rule identifier for matching with data message identifiers, and the first set of attributes are attributes used in the rule identifiers of the service rules of the set of service nodes.

After collecting the first and second sets of attributes, the context filtering node on the host compares the first and second sets of attributes to generate a service tag to represent a subset of the first set of attributes associated with the data message flow. The method associates this service tag with the data message flow. This service tag can then be used to identify the subset of attributes associated with the data message flow when a service node needs to process its attribute-based service rules for the data message flow.

In some embodiments, the context filter provides the service tag associated with the data message flow to the DCN and to an attribute-resolving engine. When sending a data message for this flow, the DCN forwards the data message's service tag along in-band (i.e., with the data message flow) or out-of-band (i.e., separately from the data message flow), so that a service node can use this service tag to process its attribute-based service rules.

To process its attribute-based service rules, a service node provides the data message flow's service tag to the attribute-resolving engine. From the context-filtering engine, the attribute-resolving engine receives the service tag with the subset of attributes represented by this tag, and stores this information in a mapping data structure (e.g., mapping table) that associates each service tag with its corresponding attribute subset. The attribute-resolving engine is part of a service node in some embodiments, while it is separate from all service nodes in other embodiments.

When the attribute-resolving engine receives the service tag from the service node, this engine finds this service tag in its mapping data structure, retrieves the tag's associated attribute subset from the mapping structure, and returns the attribute subset to the service node. The service node then uses the returned attribute subset to identify a service rule that matches this subset and then performs a service operation based on the action parameters specified by this service rule. Examples of such service operations include firewall operations, load balancing operations, intrusion detection operations, intrusion prevention operations, encryption operations, and other types of middlebox operations.

As mentioned above, the first and second sets of attributes collected by the context-filtering node in some embodiments are L7 parameters and/or group identifiers. For instance, in some embodiments, a guest introspection (GI) agent runs on a DCN. Upon occurrence of an event (e.g., a login event or the start of a connection session), the guest introspection agent collects a number of L7 parameters relating to the event. Examples of these parameters include login identifiers, group identifiers to which subscribers (e.g., active directory SIDs) or applications belong, location, device information, access levels, etc. In some embodiments, the information collected by the GI relates to one data message flow or connection session, while in other embodiments, the collected information relates to more than one data message flow or connection session (e.g., relates to all data message flows after a login event).

The guest introspection agent passes this collected information to the context-filtering node. This information serves as the second set of attributes mentioned above. In some embodiments, the first set of attributes are used in the rule identifiers of the set of service nodes and the context-filtering node collects these attributes from the service node set. In some embodiments, the first and second sets of attributes are identical types of attributes and the context-filtering node just identifies the subset of the second set of attributes that are part of the first set of attributes, in order to identify the service tag for a data message flow. Conjunctively, or alternatively, the first set of attributes in some embodiments are group identifiers, and the context-filtering node uses the second set of attributes to identify one or more group identifiers associated with the data message flow. The context-filtering node then associates the identified group identifiers with the service tag for the data message flow.

When the DCN embeds the service tag in-band within the data message flow, the service tag can be used to perform service operations on other appliances and/or host computers (e.g., on host computers other than the host computer on which the DCN executes). In such cases, an attribute-resolving agent on the other appliance and/or host computer would translate the service tag to a set of attributes, which are then used to identify one or more service rules to process for the data message flow.

To facilitate the processing of attribute-based service rules at the other appliance and/or host computer, the host computer that creates the service tag definition in some embodiments sends this definition to the other appliance/host computer. In some of these embodiments, a module (e.g., a context filter or an attribute-resolving agent) of the other device (i.e., other appliance or host computer) receives or retrieves the service tag definitions from the context-filtering agent of the host computer that generated the service tag definition. In some of these embodiments, this communication is a control channel communication between these two devices.

As mentioned above, the service tag definitions identify a set of attributes associated with each service tag in some embodiments. In some embodiments, each service tag's definition also includes a unique identifier (e.g., a host identifier). This unique identifier allows the attribute-resolving agent of the device that receives the service tag definition from multiple host computers to map the service tags to attributes correctly, because different host computers may use the same service tag and the attribute-resolving agent would need the unique identifiers embedded in the service tags to differentiate two similar service tags.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel distributed architecture for configuring and performing context-rich, attribute-based services in a datacenter with several host computers that execute data computer nodes (DCNs) and service nodes. This distributed architecture allows the hosts to perform context-rich, attribute-based services efficiently on data messages transmitted by and/or to the data compute nodes executing on the hosts. This architecture can efficiently process service rules that are defined by reference to a wide range of contextual attributes.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
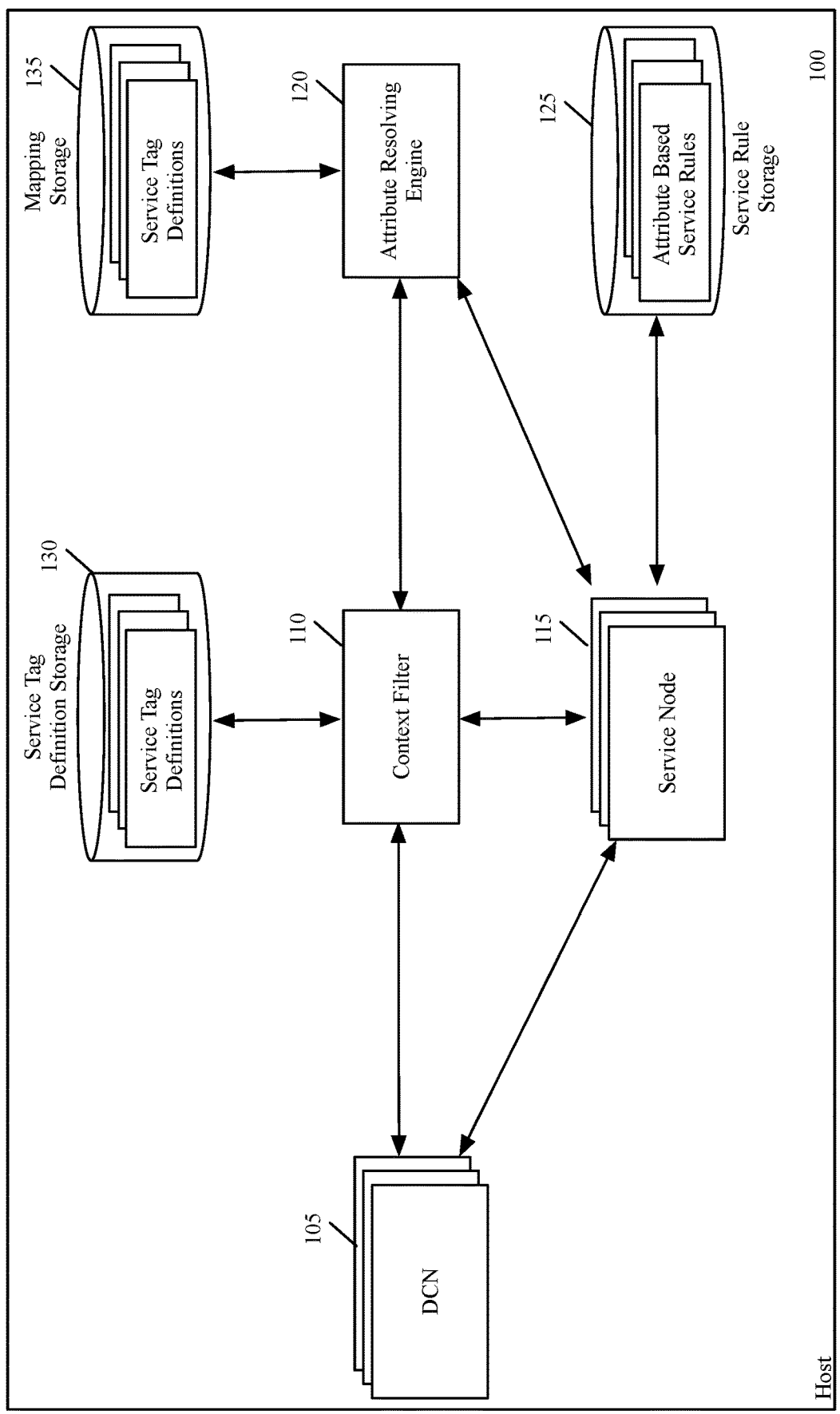
FIG. 1 illustrates a host computer that in some embodiments is used to establish a distributed architecture for configuring and performing context-rich, attribute-based services in a datacenter.

FIG. 1 illustrates a host computer 100 that in some embodiments is used to establish a distributed architecture for configuring and performing context-rich, attributed-based services in a datacenter. As shown, host computer 100 includes several DCNs 105, a context filter module 110, several service nodes 115, and an attribute-resolving engine 120. It also includes an attribute-based, service-rule storage 125, a service-tag definition storage 130, and a mapping storage 135.

The context filter 110 on the host 100 collects a set of attributes associated with service rules processed by the set of service nodes on the host computer, in order to identify the attributes that are used to define the service rules, which it will then use to filter out the unnecessary attributes collected from the DCNs. In some embodiments, the context filter 110 interacts with the service node 115 through a policy engine (not shown). This policy engine serves as an interface between the service nodes 115 and the context filter 110.

In some embodiments, the collected set of attributes may include L2-L4 header parameters, but also include attributes that are not L2-L4 header parameters. For instance, in some embodiments, these sets of attributes include L7 parameters or group identifiers (e.g., network security group identifiers). Also, in some embodiments, each service rule includes a rule identifier for matching with data message identifiers, and the collected set of attributes are attributes used in the rule identifiers of the service rules of the set of service nodes. The service nodes are service modules (also called service engines below) that execute on the host 100.

In some embodiments, the context filter 110 collects the set of attributes by interacting with the service nodes through a service node interface (e.g., a set of APIs, not shown). In these embodiments, the service nodes retrieve these attributes from the service rule storage 125, and provide them to the context filter. In other embodiments, the context filter 100 collects the set of service-rule attributes by directly accessing the attribute-based, service-rule storage 125, or accessing these rules through another module.

In addition to collecting service rule attributes, the context filter 110 also collects attribute sets from the DCNs 105 that execute on host 100. The DCNs are virtual machines in some embodiments, containers in other embodiments, and VMs and containers in yet other embodiments. In some embodiments, each time a DCN starts a new data message flow, or each time the DCN is about to start a set of new data message flows (e.g., upon occurrence of an event, such as a login event), the DCN 105 provides a set of attributes to the context filter 110. In some embodiments, a guest-introspection agent on the DCN 105 detects a new event on the DCN, captures a set of attributes associated with that event, and sends this set of attributes to the context filter. Like the attributes collected from the service rules, the attributes collected from the DCNs in some embodiments may include L2-L4 header parameters, but also include attributes that are not L2-L4 header parameters (such as L7 parameters or group identifiers). In other embodiments, the attributes collected from the DCNs do not include L2-L4 header parameters.

After collecting a set of attributes from a DCN 105, the context filtering node on the host compares this set of attributes with the set of attributes collected from the service rules to generate a service tag to represent a subset of the DCN-collected attribute set that is used in one or more service rules (i.e., that are within the attribute set collected from the service rules). The context filter then returns the service tag to the DCN 105 from which it received the attribute set, so that the DCN can associate this service tag for the data message flow or flows for which it collected the attribute set. The DCN (e.g., the GI agent of the DCN) in some embodiments stores the service tag in a cache storage (not shown) of the DCN, so that it can use the service tag for the data message flow or flows subsequently without having to re-access the context filter 110.

The service tag can be used to identify the subset of attributes associated with a data message flow when a service node needs to process its attribute-based service rules for the data message flow that is associated (e.g., by the DCN) with the service tag. For each service tag, the context filter 110 in some embodiments generates a service tag definition that identifies the service tag and the subset of attributes associated with the service tag. In some embodiments, the context filter 110 provides the generated service tag's definition to the attribute-resolving engine 120, and the attribute-resolving engine 120 stores this definition in a mapping data storage 135 (e.g., with database with one or more mapping tables) that associates each service tag with its corresponding attribute subset.

When sending a data message for this flow, the DCN 105 forwards the data message's service tag along in-band (i.e., with the data message flow) or out-of-band (i.e., separately from the data message flow), so that a service node can use this service tag to process its attribute-based service rules. To process its attribute-based service rules, a service node 115 provides the data message flow's service tag to the attribute-resolving engine 120. The attribute-resolving engine 120 is part of a service node in some embodiments, while it is separate from all service nodes in other embodiments. In still other embodiments, each service node 115 has its own attribute-resolving engine 120.

When the attribute-resolving engine 120 receives the service tag from a service node 115, the attribute-resolving engine finds this service tag in its mapping data storage 135, retrieves the tag's associated attribute subset from the mapping storage, and returns the attribute subset to the service node 115. The service node then uses the returned attribute subset to identify a service rule that matches this subset and then performs a service operation based on the action parameters specified by this service rule. Examples of such service operations include firewall operations, load balancing operations, intrusion detection operations, intrusion prevention operations, encryption operations, and other types of middlebox operations.

Figure 2:
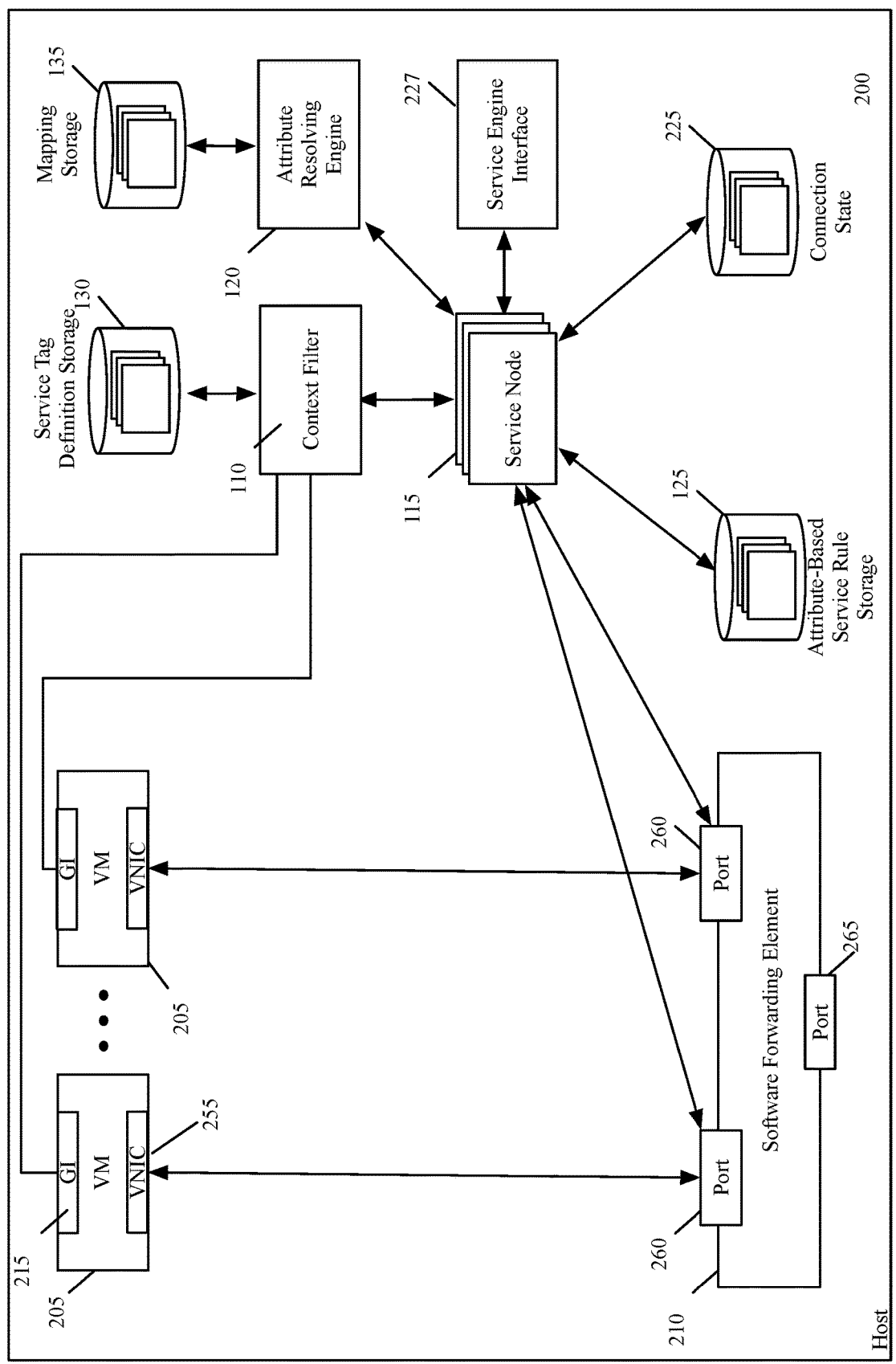
FIG. 2 illustrates a more-detailed example of a host computer that in some embodiments is used to establish a distributed architecture for configuring and performing context-rich, attributed-based services in a datacenter.

FIG. 2 illustrates a more-detailed example of a host computer 200 that in some embodiments is used to establish a distributed architecture for configuring and performing context-rich, attribute-based services in a datacenter. This host computer 200 includes many of the same components as host computer 100, such as context filters 110, service nodes 115, attribute resolving engine 120, attribute-based service rule storage 125, service tag definition storage 130, and mapping storage 135. Also, on host 200, the DCNs 105 are VMs 205.

In addition to these components, the host computer 200 includes a software forwarding element 210, a connection state data storage 225, and a service engine interface 227. In some embodiments, the software forwarding element 210, the service engine 115, the rule data storage 125, the connection state data storage 225, attribute resolving engine 120, the mapping storage 135, and the service engine interface 227 are in the kernel space of the hypervisor, while the VMs 205, context filter 110, and the service tag definition storage 130 are in the hypervisor's user space. In other embodiments, the context filter 110 and the service tag definition storage 130 are also part of the hypervisor kernel space. In some embodiments, one or more service nodes are kernel space modules, while one or more other service nodes are user space modules (e.g., are service VMs).

The VMs 205 are virtual machines executing on top of the hypervisor (not shown) that executes on the host. Examples of such machines include webservers, application servers, database servers, etc. In some cases, all the VMs belong to one entity, e.g., an enterprise that operates the host. In other cases, the host executes in a multi-tenant environment (e.g., in a multi-tenant data center), and different VMs may belong to one tenant or to multiple tenants.

Each VM 205 includes a guest introspection (GI) agent 215 that interacts with the context filter 110 to provide attribute sets to this filter, and to receive service tags for these attribute sets. As mentioned above, the sets of attributes collected by the context-filtering node from the service rules and the DCNs in some embodiments are L7 parameters and/or group identifiers. Upon occurrence of an event (e.g., a login event or the start of a connection session) on a VM, the GI agent of the VM in some embodiments collects a number of L7 parameters relating to the event. Examples of these parameters include login identifiers, group identifiers to which subscribers (e.g., active directory SIDs) or applications belong, location, device information, access levels, etc. In some embodiments, the information collected by the GI relates to one data message flow or connection session, while in other embodiments, the collected information relates to more than one data message flow or connection session (e.g., relates to all data message flows after a login event).

The GI agent 215 passes this collected set of attributes for the event to the context filter 110. The context filter 110 then compares these attributes to the attributes used in the service rule identifiers of the service rules in the service rule storage 125 to identify the subset of the GI provided attribute set that is used in the service rules. If it has not created a service tag for this identified subset of attributes, the context filter 110 then creates a service tag for this subset, and stores this service tag's definition in the service tag definition storage 130. The context filter then provides the service tag associated with the identified subset of attributes to the GI that provides the attribute set, so that the GI can associate its VM's transmitted data messages in-band or out-of-band with the service tag, which, in turn, allows one or more service nodes to subsequently use the service tag to identify the service operations that are needed for the data messages.

In some embodiments, the sets of attributes that the context filter collects from the service rules and from the GI agents are identical types of attributes and the context-filtering node just identifies the subset of the GI-collected attributes that are part of the service rule identifier attributes, in order to identify the service tag for a data message flow. Conjunctively, or alternatively, the service rule identifier attributes in some embodiments can be group identifiers, and the context filter 110 uses the GI-collected attributes to identify one or more group identifiers associated with a data message flow. The context filter 110 then associates the identified group identifiers with the service tag for the data message flow.

As shown, each VM 205 also includes a virtual network interface card (VNIC) 255 in some embodiments. Each VNIC is responsible for exchanging messages between its VM and the software forwarding element 210. Each VNIC connects to a particular port of the software forwarding element 210. The software forwarding element 210 also connects to a physical network interface card (NIC) (not shown) of the host. In some embodiments, the VNICs are software abstractions of a physical NIC (PNIC) that are implemented by the virtualization software (e.g., by the hypervisor).

In some embodiments, the software forwarding element (SFE) maintains a single port 260 for each VNIC of each VM. The software forwarding element 210 connects to a physical NIC (through a NIC driver (not shown)) to send outgoing messages and to receive incoming messages. In some embodiments, the software forwarding element 210 is defined to include a port 265 that connects to the PNIC's driver to send and receive messages to and from the PNIC.

The software forwarding element 210 performs message-processing operations to forward messages that it receives on one of its ports to another one of its ports. For example, in some embodiments, the software forwarding element tries to use data in the message (e.g., data in the message header) to match a message to flow based rules, and upon finding a match, to perform the action specified by the matching rule (e.g., to hand the message to one of its ports 260 or 265, which directs the message to be supplied to a destination VM or to the PNIC).

In some embodiments, the software forwarding element 210 is a software switch, while in other embodiments it is a software router or a combined software switch/router. The software forwarding element 210 in some embodiments implements one or more logical forwarding elements (e.g., logical switches or logical routers) with software forwarding elements executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013 May 8), VXLAN: A Framework for Overlaying Virtualized Layer 2 Networks over Layer 3 Networks, IETF.

The ports of the software forwarding element 210 in some embodiments include one or more function calls to one or more modules that implement special input/output (I/O) operations on incoming and outgoing messages that are received at the ports. Examples of I/O operations that are implemented by the ports 260 include ARP broadcast suppression operations and DHCP broadcast suppression operations, as described in U.S. patent application Ser. No. 14/070,360. Other I/O operations (such as firewall operations, load balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs, etc.) implement the I/O function call operations (such as the firewall function calls), instead of the ports 260.

In some embodiments, one or more of function calls of the SFE ports 260 can be to one or more service nodes 115 that process attribute-based service rules in the attribute-based service rule storage 125. Each service node 115 in some embodiments has its own attribute-based service rule storage 125. To perform its attribute-based service operation for a data message flow, a service engine 115 in some embodiments has the attribute resolving engine 120 first convert the service tag associated with the data message flow to a subset of attributes, and then uses this subset of attributes to identify a service rule in its service rule data storage 125 for it to process.

Specifically, for a service engine 115 to perform its service check operation, the forwarding element port 260 that calls the service engine supplies a set of attributes of a message that the port receives. In some embodiments, the set of message attributes are message identifiers, such as traditional five tuple identifiers, which include the message's source identifier, destination identifier, source port, destination port, and protocol. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

When the VMs send the service tags in-band, the set of attributes supplied to the service node by the SFE port also includes in some embodiments the service tag for the data message flow. Before supplying these identifiers to the service engine, the SFE port extracts these identifiers from a message that it receives. When the VMs send the service tags in-band, the SFE port 260 in some embodiments has one of the I/O modules that it calls extract the service tag from the data message flow, and provides this service tag to the service engine 115.

In other embodiments, the VMs do not send the service tags in-band with the data message flow, but send the service tags out-of-band to one or more modules executing on the host 200. In some of these embodiments, the SFE port does not provide the service tag to the service node 115 that it calls. Instead, the service node 115 identifies the service tag for the data message flow (1) from the message identifiers (e.g., five-tuple identifiers) that it receives from the SFE port, and (2) from a record that the service node receives out-of-band from the VM that identifies the service tag for the message identifier.

In other embodiments, the service node 115 provides the message identifiers (e.g., five-tuple identifiers) that it receives from the SFE port to another module, which then identifies the service tag for the data message flow (1) from the message identifiers (e.g., five-tuple identifiers) that it receives from the service node, and (2) from a record that this module receives out-of-band from the VM that identifies the service tag for the message identifier. In some embodiments, this module is the attribute-resolving engine 120. Hence, in some embodiments, the service node provides a set of identifiers (e.g., five-tuple identifier) for a message to the attribute-resolving engine 120, and this engine first maps this identifier set to a service tag, and then maps this service tag to a subset of attributes that it returns to the service node. In other embodiments, the service node either identifies the service tag for a data message itself or obtains it from another module, and then provides this service tag to the attribute-resolving engine 120, in order to obtain the subset of attributes for a data message flow.

After receiving the subset of attributes for a data message flow from the attribute resolving engine 120, the service engine 115 in some embodiments performs its service operation based on service rules that are stored in the service rule storage 125. To perform its service operation, the service engine 115 matches the received attribute subset with corresponding attribute sets that are stored for the service rules. In some embodiments, the service engine 115 receives the service rules that it stores in its storage 125 through the service engine interface (SEI) 227 from one or more controllers, as further described below.

In some embodiments, each service rule in the data storage 125 has a rule identifier and an action parameter set. As mentioned above, the rule identifier of a service rule in some embodiments can be defined in terms of one or more parameters that are not L2-L4 header parameters (e.g., are L7 parameters). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute subset with the rules, the service engine compares the received attribute subset with the associated identifiers of the service rules stored in the service rule data storage 125. Upon identifying a matching rule, the service engine 115 performs a service operation (e.g., a firewall operation, a load balancing operation, an encryption operation, other middlebox operation, etc.), based on the action parameter (e.g., based on Allow/Drop parameter, the load balancing criteria, encryption parameters, etc.) of the matching rule In some embodiments, the service rule data storage 125 is defined in a hierarchical manner to ensure that a message rule check will match a higher priority rule before matching a lower priority rule, when the message's attribute subset matches multiple rules. Also, in some embodiments, the service rule data storage 125 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the storage 125 based on an attribute subset that the attribute-resolving engine 120 provided for a service tag associated with a first data message of a data message flow, the service engine of some embodiments stores the service rule (or a reference to the service rule) in the connection state data storage 225, so that it can later use this service rule for subsequent data messages of the same flow.

In some embodiments, the connection state data storage 225 stores the service rule, or a reference to the service rule, that the service engine 115 identifies for different message identifier sets (e.g., for different five-tuple identifiers that identify different data message flows). In some embodiments, the connection state data storage 225 stores each service rule, or reference to the service rule, with an identifier (e.g., a five-tuple identifier and/or a hash value) that is generated from the matching message identifier set. Before checking with the service rule data storage 125 for a particular message identifier set, the service rule engine 115 of some embodiments checks the connection state data storage 225 to determine whether this storage has a cached service for this message identifier set. If not, the service rule engine then directs the attribute-resolving engine 120 to map the message flow's service tag to an attribute subset, and then checks the service rule data storage 125 for a service rule that matches the identified attribute subset. When the connection state data storage has an entry for the particular message identifier set, the service engine performs its service operation based on this service rule's action parameter set.

Figure 3:
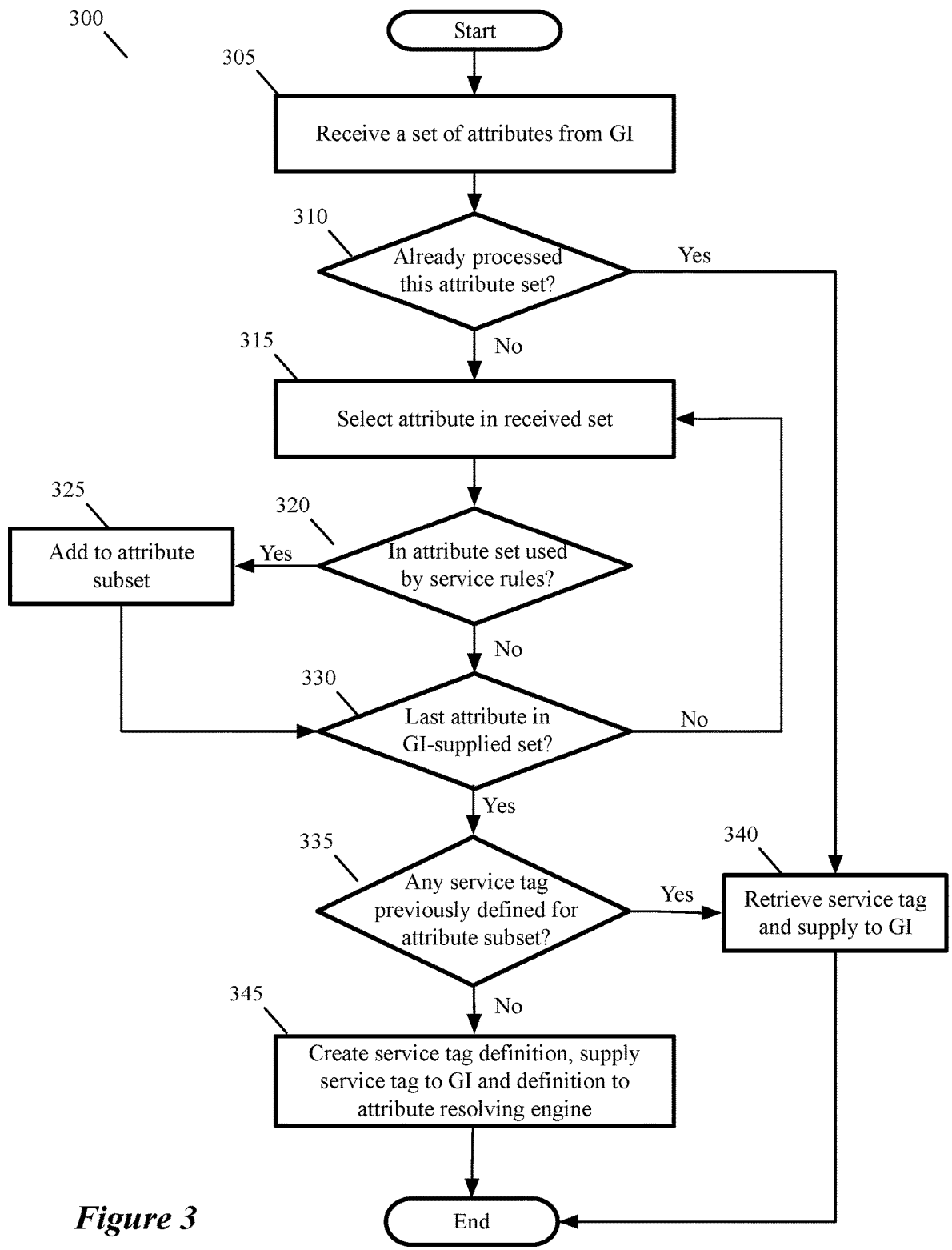
FIG. 3 conceptually illustrates a filtering process that the context filter performs whenever it receives a set of attributes from a GI agent.

FIG. 3 conceptually illustrates a filtering process 300 that the context filter 110 performs whenever it receives a set of attributes from a GI agent 215. This process identifies the subset of attributes that are relevant for the service rules processed by the attribute-based service engine(s), generates a service tag for the identified attribute subset when necessary, and provides this service tag to the GI agent 215. As shown, the process 300 initially receives (at 305) a set of attributes from the GI agent 215.

Next, at 310, the process determines whether it has already processed this same exact set of attributes. To make this determination, the process stores in some embodiments each set of attributes that it processes in a cache storage, along with the service tag that the process identifies for each attribute set. At 310, the process 300 in these embodiments examines this cache storage to determine whether it has processed the attribute set received at 305. When the process 300 determines (at 310) that it has previously processed the attribute set received at 310, it provides (at 340) to the GI agent 215 the service tag that the process 300 previously generated for this attribute set (e.g., retrieves this service tag from its cache storage and provides this service tag to the GI agent 215). After 340, the process ends.

When the process determines (at 310) that it has not previously processed the received attribute set, the process selects (at 315) an attribute in this received set, and determines (at 320) whether this selected attribute is in the set of attributes that are currently used in the service rules of the attribute-based service engines 115. In some embodiments, the context filter collects the attributes used in the service rule identifiers from the service engines before it performs the process 300. Also, in some embodiments, as each service rules are deleted, added or modified, the context filter modifies the set of attributes collected from the service rules to reflect these changes. In some of these embodiments, the process adjusts the service tag definitions to account for these service rule changes, and adjusts these definitions in its own service tag definition storage 130 and provides these new definitions to the attribute-resolving engine 120 so that this engine can store these new definitions in its storage 135.

When the process determines (at 320) that the selected attribute is in the attribute set collected from the service rules, the process adds (at 325) this attribute to the subset of attributes that it creates for the GI agent, and then transitions to 330. The process also transitions to 330 from 320, when it determines that the selected attribute is not in the attribute set collected from the service rules. By transitioning from 320 to 330 without adding the selected attribute to the defined attribute subset, the process effectively filters out the selected attribute from the service tag definition.

At 330, the process determines whether it has examined all the attributes in the attribute set received from the GI agent. If not, the process transitions back to 315 to select another attribute in the received attribute set, and then repeats operation 320 to either add this selected attribute to the attribute subset (at 325), or to filter out this selected attribute. When the process determines (at 330) that it has examined all the attributes in the received attribute set, the process determines (at 335) whether it has previously created a service tag for the attribute subset that it has just generated by examining each attribute in the received attribute set.

To make this determination (at 335), the process 300 in some embodiments examines the service tag storage 130 to determine whether any service tag in this storage has been created for the exact attribute subset that the process created in this iteration. When the process 300 determines (at 335) that it has previously generated a service tag for the exact same attribute subset that it just generated, it provides (at 340) to the GI agent 215 the service tag that it has stored in its service tag storage 130 for this attribute subset. After 340, the process ends. It should be noted that in some embodiments, the process 300 does not perform the check at 310, but performs the check at 335, while in other embodiments, the process does not perform the check at 335, but performs the check at 310.

When the process 300 determines (at 335) that it has not previously generated a service tag for the exact same attribute subset that it just generated, it (at 345) creates a service tag for this attribute subset, and stores this service tag's definition (which includes the service tag's identifier and its associated attribute subset) in the service tag definition storage 130. In some embodiments, the service tag definition also includes a host identifier that identifies the host on which the service tag was generated. As further described below, this host identifier can be used by attribute-resolving engines to differentiate identical service tags that are generated by different context filters 110 on different hosts 200.

At 345, the process also provides the service tag to the GI agent 215 that provided the attribute set at 305. Also, the process provides (at 345) a service tag definition (which includes the service tag's identifier, its associated attribute subset, and in some cases, the host identifier) to the attribute-resolving engine 120, so that it can store this definition in its mapping storage 135. After 345, the process ends. While FIG. 3 illustrates that a service tag is created for the attribute set received from a GI agent 215, one of ordinary skill will realize that in some embodiments no service tag is generated when none of the supplied attributes are used in any of the service rules of the service node(s) of the host.

Figure 4:
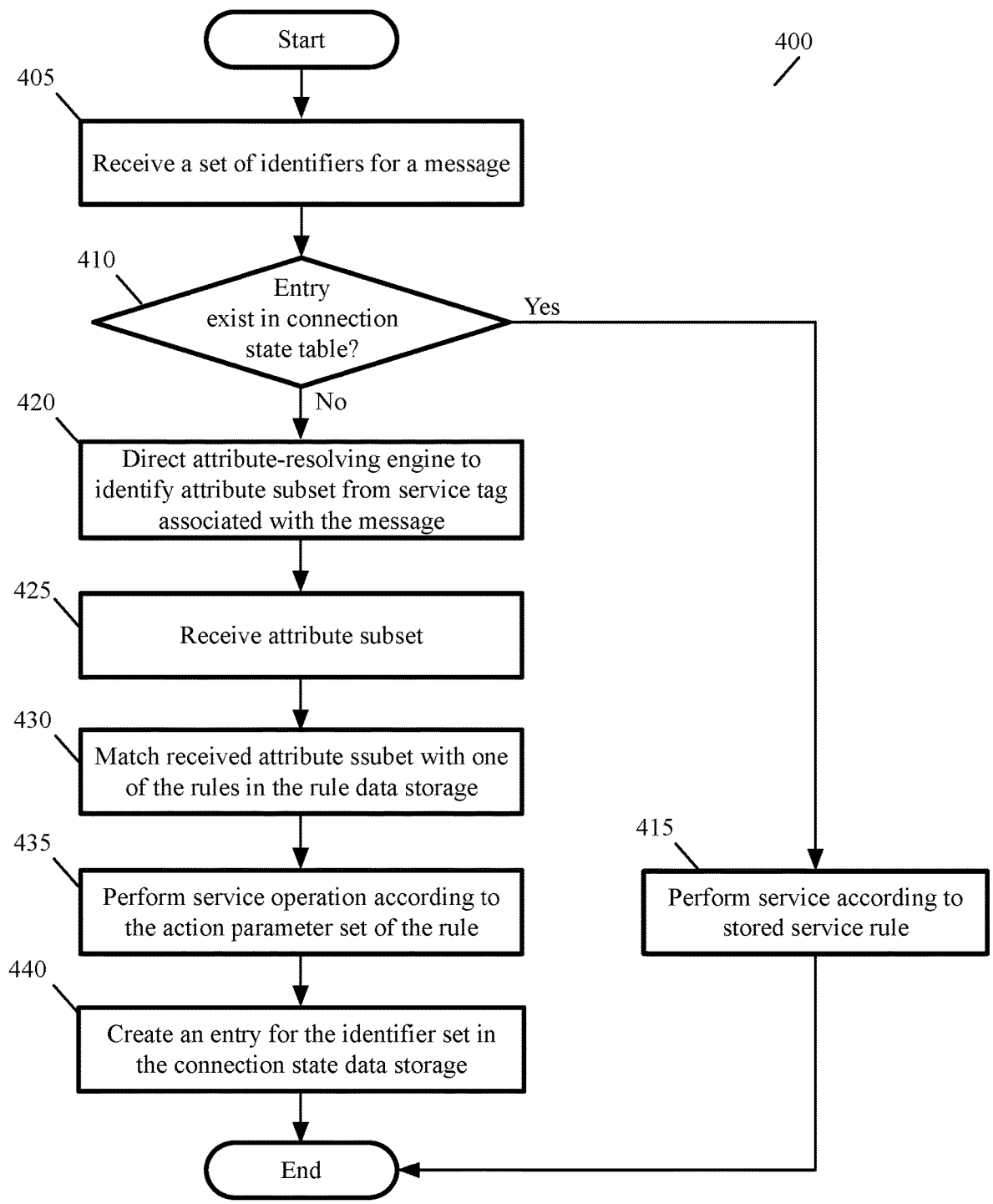
FIG. 4 conceptually illustrates a process that the service engine performs when a port calls the engine for a received message associated with a VM connected to the port.

FIG. 4 conceptually illustrates a process 400 that the service engine 115 performs when a port 260 calls the engine 115 for a received message associated with a VM 205 connected to the port 260. The received message in some embodiments can be a message sent by the port's VM. As shown, the process 400 initially receives (at 405) a set of identifiers (e.g., a set of L2, L3 and/or L4 header values) of the data message. In some embodiments, the received message identifiers are extracted from the message by the port or by a I/O module called by the port. For instance, in some embodiments, the received attributes set includes the message's extracted five tuples.

Next, at 410, the process 400 determines whether it has an entry for the received message identifier set in its connection state data storage 225. This is because the service engine may have previously performed a service rule check for another message with an identical set of attributes, and cached the result of this check in the connection state data storage 225. In some embodiments, the process examines the connection state data storage 225 for a record that has a record identifier that matches the received identifier set or a hash of the received identifier set.

When the process identifies (at 410) an entry in the connection state data storage 225 that matches the received message identifier set, the process retrieves (at 415) a service action parameter set that is stored in the identified entry of the connection state data storage 225. At 415, the process then performs the service action on the data message based on the retrieved service action parameter set. After 415, the process 400 ends.

On the other hand, when the process cannot identify (at 410) an entry in the connection state data storage 225, the process directs (at 420) the attribute-resolving engine 120 to identify the attribute subset for the data message from the service tag associated with the data message. To do this, the service tag associated with the received data message has to first be identified.

The service tag is identified differently in different embodiments. In some embodiments, the service engine receives the service tag for the data message from the SFE port that calls it (e.g., after this port extracts or has another module extract the service tag from the data message header or associated control messaging (e.g., SYN message)). In other embodiments, the service engine 115 provides the message identifier set (received at 405) to the attribute-resolving engine 120, and has this engine 120 identify the service tag before identifying the attribute subset based on this service tag. In some of these embodiments, the attribute resolving engine receives the service tag for the data message (e.g., receives a record that identifies the service tag for the data message's five tuple identifier) through an out-of-band communication, and stores this service tag and the data message's identifier in a storage, which the engine 120 later accesses when it receives the service tag from the service engine 115. In still other embodiments, the source VM's GI agent 215 provides the service tag and its associated data message identifier(s) to the service engine, which stores this tag and its associated message identifier(s) to use (at 420) subsequently to identify a service tag for a received data message.

At 425, the process 400 receives from the attribute-resolving engine the attribute subset associated with the message's service tag. The attribute-resolving engine 120 identifies the attribute subset by identifying a record in its mapping storage 135 that has the service tag in its record identifier, and retrieving the attribute subset from this matching record.

At 430, the process identifies a service rule in the service data storage 125 that matches the received attribute subset. To identify the service rule, the process 400 searches the service rule data storage 125 to identify the entry that has an attribute subset that matches the attribute subset received from the attribute-resolving engine. In some embodiments, the service rule data storage 125 is defined in a hierarchical manner to ensure that message rule check will match a higher priority rule before matching a lower priority rule, when the message's attribute subset matches multiple rules.

After identifying the matching service rule, the process 400 retrieves (at 435) a service action parameter set that is stored in the identified entry of the service rule data storage 125, and performs a service on the data message based on the retrieved service action parameter set. Examples of such actions include firewall operations, load balancing operations, encryption operations, other middlebox operations, etc.

After the service engine performs the service operation, the service engine provides (at 435) the processed data message to the SFE port when service operation does not result in the dropping of the data message. The SFE port can then call another service engine or provide this message to the SFE to forward the data message to the data message's destination. When the service operation requires the data message to be dropped (e.g., a firewall operation requires that the data message to be dropped) or re-directed, the service engine informs the SFE 210 that the data message should be dropped or re-directed. After 435, the process creates (440) an entry in the connection state data storage 225 for the received attribute set and stores the identified service action in this entry. The process ends after 440.

When a DCN (e.g., VM) embeds the service tag in-band within the data message flow, the service tag can be used to perform service operations on other appliances and/or host computers (e.g., on host computers other than the host computer on which the DCN executes). In such cases, an attribute-resolving agent on the other appliance and/or host computer would translate service tag to an attribute subset, which is then used to identify one or more service rules to process for the data message flow.

To facilitate the processing of attribute-based service rules at the other appliance and/or host computer, the host computer that creates the service tag definition in some embodiments sends this definition to the other appliance/host computer. In some of these embodiments, a module (e.g., context filter or attribute-resolving engine) of the other device (i.e., other appliance or host computer) receives or retrieves the service tag definitions from the context-filtering agent of the host computer that generated the service tag definition. In some of these embodiments, this communication is a control channel communication between these two devices. In other embodiments, this communication is through a set of controllers (e.g., a set of controllers that configure the devices with service rules).

As mentioned above, the service tag definitions identify an attribute subset associated with each service tag in some embodiments. In some embodiments, each service tag's definition also includes a unique identifier (e.g., a host identifier) that allows the attribute-resolving agent of the device that receives the service tag definition from multiple host computers to map the service tags to the attributes correctly, because different host computers may use the same service tag and the attribute-resolving agent would need the unique identifiers embedded in the service tags to differentiate two similar service tags.

Figure 5:
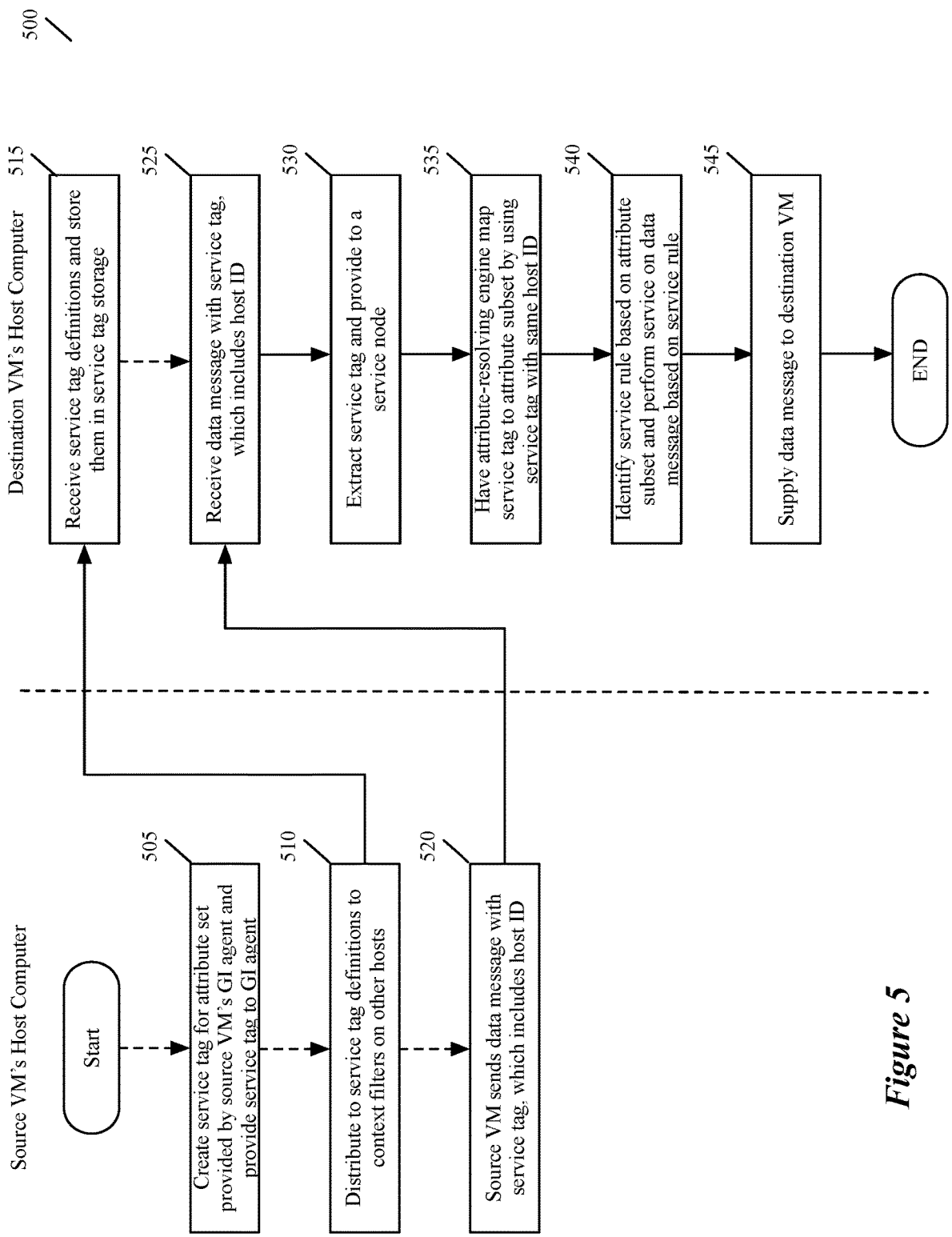
FIG. 5 presents a process that conceptually illustrates a set of operations performed on a source VM's host computer and a destination VM's host computer to perform service operations on the destination VM's host computer based on a service tag defined on the source VM's host computer.

FIG. 5 presents a process 500 that conceptually illustrates a set of operations performed on a source VM's host computer and a destination VM's host computer to perform service operations on the destination VM's host computer based on a service tag defined on the source VM's host computer. A source VM is a VM that is a source of a data message (i.e., is the VM that sends the data message), while a destination VM is a VM that is a destination of the data message (i.e., is the VM that receives the data message). In the flowchart illustrated in this figure, dashed arrows are shown for operations that might have an arbitrary amount of delay between them.

As shown, the process 500 starts (at 505) when the context filter 110 of the source VM's host computer generates a service tag for an attribute set provided by the source VM's GI agent 215. One detailed example of how a service tag is created for an attribute set was explained above with reference to FIG. 3. The generated service tag in some embodiments includes the host identifier of the source VM's host computer, so that the attribute-resolving engine at the destination VM's host computer can uniquely identify the service tag.

The context filter 110 provides (at 505) the generated service tag to the GI agent that provided the attribute set, and the GI agent then ensures that the source VM includes this service tag with any new data message flow that relates to the attribute data set that the GI provided initially. In some embodiments, the GI agent 215 embeds the service tag into a SYN packet of a tunnel encapsulation header (e.g., a GENEVE header, VXLAN header, GRE header, etc.). In other embodiments, the GI agent 215 sends the service tag to one or more modules on the host computer along with a set of one or more data message identifiers that relate to a set of one or more data flows related to this service tag. One of these modules then embeds the service tag in a tunnel header of a tunnel that is established between two tunnel endpoint modules on the source and host computers.

The agent also caches this service tag for any future data flows that relate to the same set of attributes. This optimizes the agent to context filtering node interactions. Some embodiments expire this cache based on a time interval policy. For example, for identity-based firewall services, once a user has logged in, the Subscriber group to which the user belongs typically remains the same and hence the end point need not continue asking for the new service tag. In other cases, it may keep generating context for every new event/connection.

After generating (at 505) the service tag and providing this tag to the GI agent 215, the context filter distributes (at 510) the service tag to the context filters of other host computers. In some embodiments, the source computer's context filter sends the definition of a service tag, each time it defines a service tag, while in other embodiments, the context filter waits a predetermined time interval to try to collect a batch of service tags to distribute. Also, in some embodiments, the context filters of the host computers directly send the service tag definitions to each other (through intervening network fabric of the datacenter). In other embodiments, the source computer's context filter sends its new service tag definitions to a set of one or more controllers (e.g., a controller that configures the service rules of the service nodes of the host computers), which then distributes the service tag definitions to context filters of other host computers.

Some embodiments limit the span and scope of the distribution of the service tag, so that the control plane is not bogged down by this traffic. Some of these embodiments limit the distribution's scope by factors such as the span of the logical switch or network, or the presence of address-sets on certain hypervisor. By transporting the service tags, in the overlay header of the underlying flow, some embodiments are able to easily move the full dynamic context around in the datacenter.

FIG. 5 illustrates that after the source computer's context filter 110 distributes (at 510) the service tag definition for the service tag that was generated (at 505), the context filter 110 of the destination VM's host computer receives (at 515) the service tag definition. As mentioned above, the definition of the service tag includes the service tag identifier, a subset of one or more attributes, and host identifier of the host computer at which the service tag was defined. The destination computer's context filter 110 provides the service tag definitions that it receives to its computer's attribute resolving engine 120.

After service tag is provided (at 505) to the GI agent, the source VM sends (at 520) the service tag along with a data message. For example, in some embodiments, the source VM sends the data message to the destination VM or a module on the destination VM's host computer along a tunnel, and inserts the service tag in the tunnel header. In other embodiments, instead of configuring the source VM to insert the service tag in the tunnel header, the GI agent 215 configures one of the I/O modules (called by the source VM's SFE port or VNIC) to insert this service tag in the tunnel header. In some of these embodiments, this I/O module is the module that performs the tunnel encapsulation operation for the VM. In other words, in these embodiments, the source VM does not establish the tunnel to the destination computer, but rather the source VM's encapsulation I/O module establishes this tunnel.

Once the data message is sent (at 520) along with the service tag, the destination VM's SFE port receives (at 525) this data message. The destination VM's SFE port then calls (at 530) an I/O module of the destination VM to decapsulate the tunnel header from the received data message. In decapsulating the tunnel header, the I/O module extracts (at 530) the service tag from the header and provides this service tag to the destination VM's SFE port. This port then calls (at 530) a service node 115 to perform a service operation (e.g., a firewall operation, a load balancing operation, an encryption operation, or any other middlebox operation) on the data message based on the extracted service tag. In some embodiments, the destination VM's SFE port also provides other attributes of the received data message (such as the received data message's five tuple identifiers) to the service node 115, which selects its service rule not only based on the service tag but also based on these other attributes.

At 535, the service node then provides the service tag to the attribute-resolving engine 120, which then maps this service tag to an attribute subset based on the mapping records in its mapping data storage 135. This storage stores all the service tag definitions that its computer's context filter generates or receives from context filters of other host computers. When the destination computer's mapping data storage 135 stores two service tags with the same service tag identifier, the attribute-resolving engine uses the host identifier of the received service tag to select the stored service tag that has the same host identifier. After identifying the stored service tag that matches the received data message's service tag, the attribute resolving engine retrieves the attribute subset of the stored service tag, and returns (at 535) this attribute subset to the service node that called it.

Next, at 540, the service engine of the destination VM's host computer then identifies a service rule in its service rule storage 125 for the data message. To do this, the service engine 115 uses the returned attribute subset to identify the highest priority service rule in the service rule storage 125 that has a rule identifier with a matching subset of attributes. In some embodiments, the service engine 115 not only identifies the matching service rule by using the returned attribute subset, but also uses one or more other identifiers of the received data message (e.g., uses one or more of the received data message's five tuple identifiers).

Once the service engine 115 identifies the service rule that matches the service tag's associated attribute subset, the destination VM's service engine 115 of some embodiment stores this rule or a reference to this rule in a cache connection state storage 225 (along with the data message's identifier (e.g., five tuple identifier), so that this engine can subsequently access this connection storage for other data messages that are part of the same flow to identify this service rule. As mentioned above, the service engines in some embodiments first check their connection state storage 225 before asking the attribute-resolving engine to map a service tag to an attribute subset when the connection state storage 225 does not store any record for the received data message's flow.

Also, after identifying (at 540) the matching service rule, the service engine 115 performs a service operation on the received data message based on the service action parameter set of the matching service rule. Examples of such service operations include firewall operations, load balancing operations, intrusion detection operations, intrusion prevention operations, encryption operations, and other types of middlebox operations.

Once the service engine 115 performs the service operation of the data message, the service engine notifies the destination VM's SFE port. When the service operation does not result in the data message being discarded or re-directed, the destination VM's SFE port provides the data message to the destination VM. In some embodiments, the destination VM's SFE port successively calls multiple service nodes 115 to perform sequentially multiple service operations on the data message based on the service tag and/or identifier, before providing the data message to the destination VM, in cases when the data message is not discarded or redirected as a result of these operations.

Figure 6:
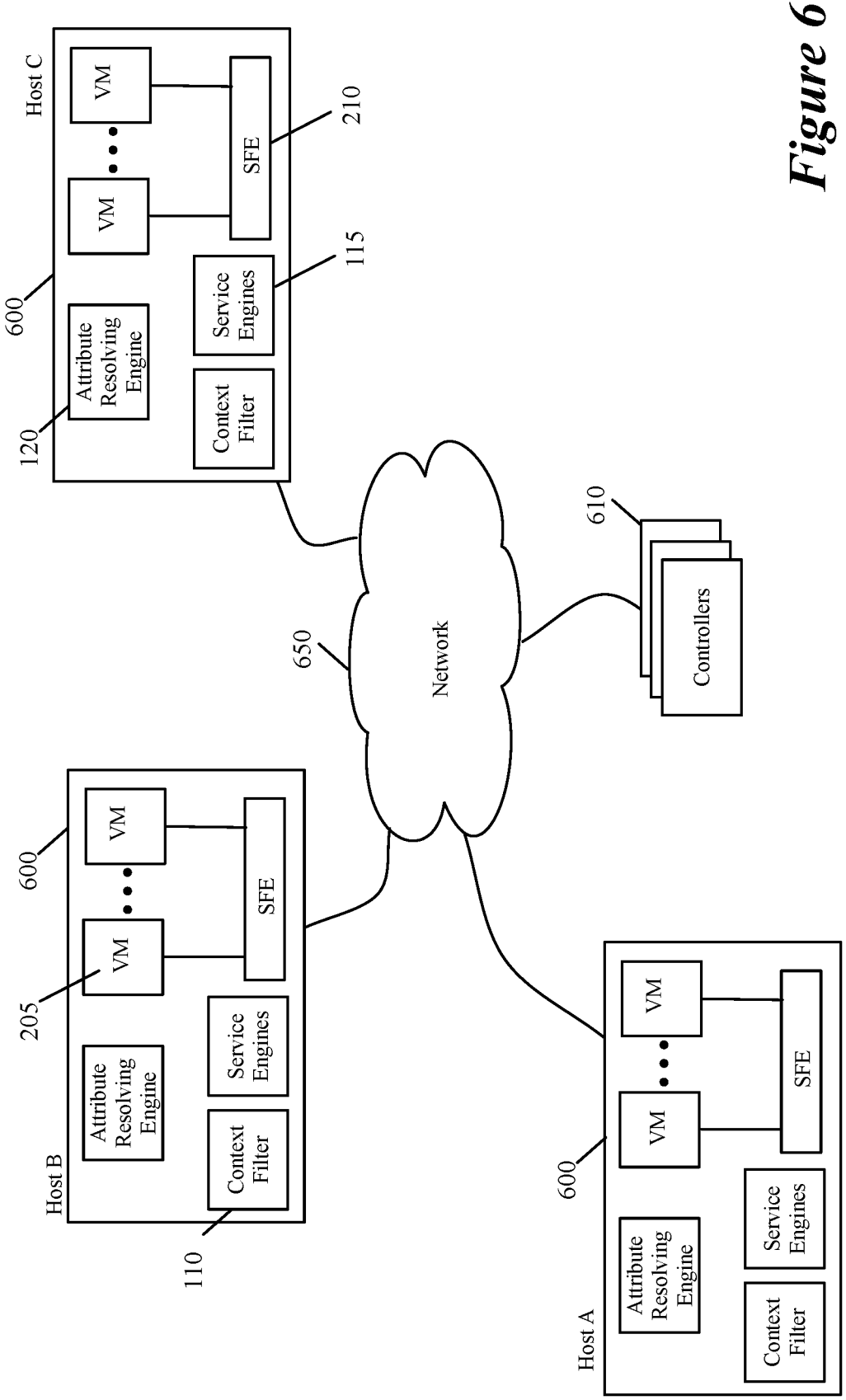
FIG. 6 illustrates an example of how the hypervisor service engines are managed in some embodiments.

FIG. 6 illustrates an example of how the service engines 115 are managed in some embodiments. This figure illustrates multiple hosts 600 in a datacenter. As shown, each host includes a service engine 115, a context filter 110, attribute-resolving engine 120, several VMs 205, and an SFE 210. It also illustrates a set of controllers 610 for managing the service engines 115, VMs 205, and SFEs 210. As mentioned above, the context filters 110 in some embodiments pass service tag definitions to each other through the controller set, while in other embodiments these filters pass these definitions directly to each other. The controller set communicates with the hosts through a network 650 (e.g., through a local area network, a wide area network, a network of networks (such as the Internet), etc.). The hosts are also communicatively connected to each other through this network 650.

Some embodiments use the following service tag data structure:

Service_Tag_n={uid,
 SN1=<nsg1, nsg2, nsg3>,
 SN2=<nsg2, nsg4, nsg5>,
 SN3=<nsg3, nsg5>}, where SN1, SN2, and SN3 are three service nodes (e.g., a firewall, a load balancer and an encryptor), uid is the host identifier, nsg stands for network security group, and nsg1-nsg5 are five network security group identifiers. As shown by this example, the service tags of some embodiments define different attribute subsets for different service nodes. In this example, nsg1, nsg2, and nsg3 are the attribute subset for service node SN1, nsg2, nsg4, and nsg5 are the attribute subset for service node SN2, and nsg3 and nsg5 are the attribute subset for service node SN3.

A nsg can be composed of AD (active directory) groups for the user identity use cases. For example, a firewall rule can be specified as src:nsgroup:Nurse, dest:Internet_NSG, action:block, HTTP, which indicates that http packets from VMs used by Nurses that are addressed to destination Internet_NSG should be dropped.

In some embodiments, the context filtering node upon startup gathers all the identity related nsgroups and their membership information that pertains to the service rules (e.g., firewall rules, encryption rules, load balancing rules, etc.) and stores it internally. It interacts with the service engines to gather this information, or with a higher level policy engine that serves as an interface between the context filtering node and the service engines.

One specific implementation of some embodiments is as follows. On every network connect operation in the VM, the GI agent (e.g., epsec agent) running inside the VM passes the context (e.g., AD user id, set of AD group ids, source ip, source port, destination ip, destination port) to the context filtering node. Based on these AD groups within the context, the context filtering node determines the associated nsgroup(s) for this context and generates a service tag with a unique host identifier. It passes this service tag back to the GI agent. The GI agent embeds this service tag into the SYN packet GENEVE header. The agent also caches this service tag for any future connections from this user. This optimizes the agent to context filtering node interactions. For identity firewall use cases, the context filtering node programs the firewall service node with the generated service tags for every connection that the guest makes. The firewall service node maintains all the service tags and uses them whenever it receives a SYN packet with a service tag embedded in the GENEVE header from the guest. It uses the service tag to map to the nsgroups and then matches them with the rule.

The service tags generated by the context filter node might change when the AD group membership or the policy nsgroup membership changes. In some embodiments, the context filter node registers for AD group membership change notifications in the management plane. For any changes to the membership the management plane notifies the context filter, which then invalidates the service tags that are affected, and these service tags are re-generated on an as-needed basis.

By placing a context filtering node and attribute-resolving engine on each host, the above-described embodiments provide an efficient, scalable approach for providing context-rich service in a data center. Huge amounts of context are typically generated at various points in a datacenter by different applications and events. Contexts such as Login IDs, Group IDs to which subscribers/applications belong, multiple attributes related to a connection such as location, device information, access levels etc.

The context itself is greatly important/precious to various service nodes but because of a variety of issues, this context information is not usually consumed within a datacenter. First, at times, this context (such as Active Directory Group SID numbers to which a subscriber belongs) can run to hundreds or thousands of values. However, typically, only a portion of the context information is used by the service rules, such as a few of the SIDs might be consumed. Second, the voluminous nature of the context makes the transportation of the context to various points of interpretation and enforcement impossible and hence renders it useless. Third, in a typical datacenter, thousands of endpoints generate the context. It becomes impossible for a central node to process this context in its entirety and distribute it to the various points of consumption.

Accordingly, the distributed context filtering and mapping of some embodiments allows the amount of context to be consumed to just the right amount required for consumption, hence doing away with the unnecessary contextual data. This approach also tokenizes the contextual data so that the context can be transported to any point within the datacenter network or beyond.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
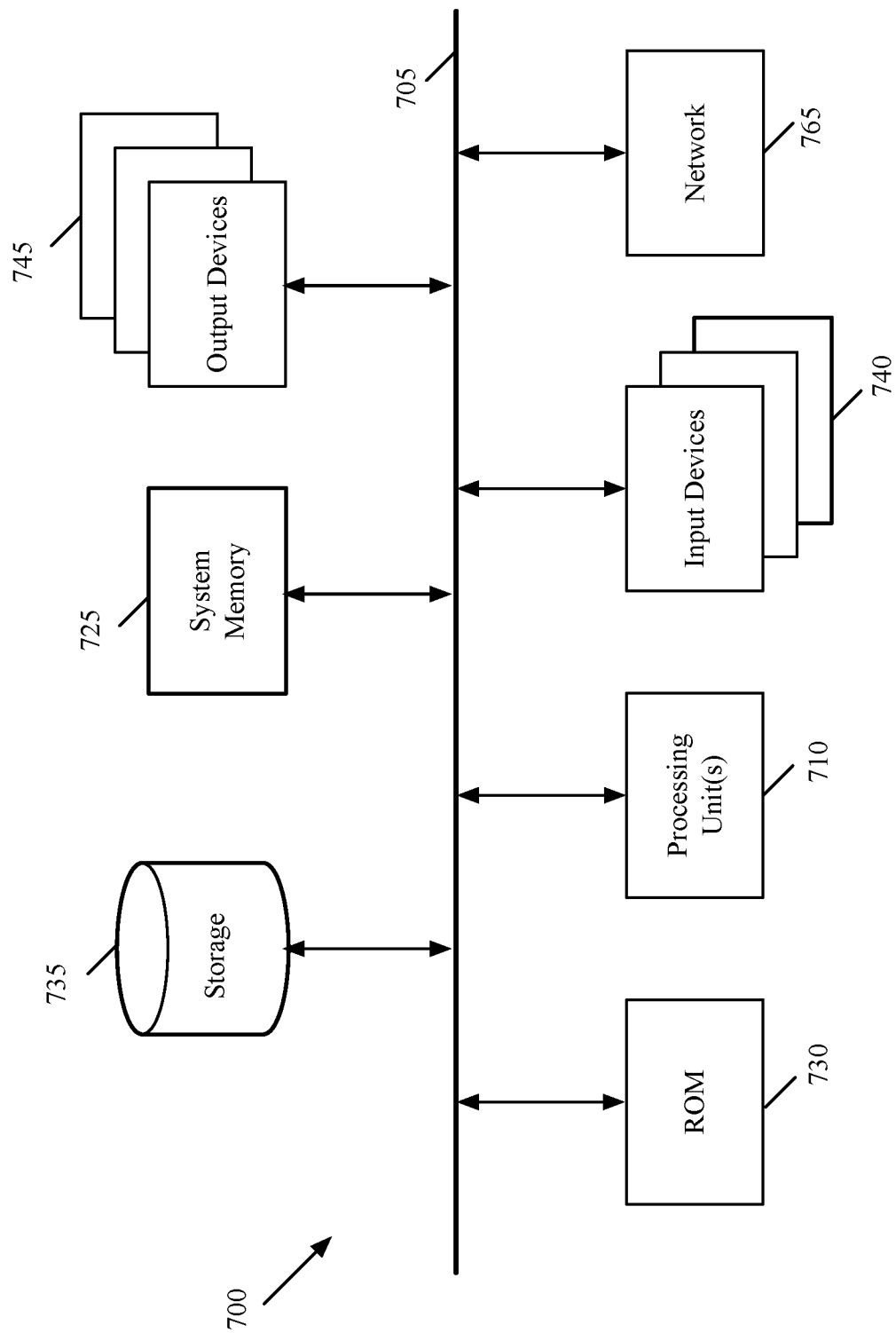
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the computer system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage device 735, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the computer system. The input devices 740 include alphanumeric keyboards and pointing devices (also called "cursor control devices"). The output devices 745 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of performing a service at a host computer that executes data compute nodes (DCNs), the method comprising:

receiving a data message;

identifying a service tag for the received data message;

identifying a set of attributes associated with the service tag;

using the identified set of attributes to identify a service rule;

performing a service on the data message based on the identified service rule.

2. The method of claim 1, wherein identifying the set of attributes comprises using the service tag to identify a record in a storage that stores a plurality of service tags and a set of attributes for each service tag.

3. The method of claim 2, wherein using the identified attribute set comprises using the attribute set to identify a record in a storage that stores a plurality of attribute sets and a service action parameter set for each attribute set.

4. The method of claim 1, wherein identifying the service tag comprises using a set of identifiers of the data message to identify the service tag in a storage that stores a plurality of service tags for a plurality of data message identifiers.

5. The method of claim 4 further comprising:
receiving a record that identifies the service tag for a message identifier of the data message before identifying the service tag for the received data message.

6. The method of claim 5, wherein receiving the record comprises receiving the record from a guest introspection agent of a DCN that sends the data message.

7. The method of claim 1, wherein identifying the service tag comprises extracting the service tag from a header of the data message.

8. The method of claim 7, wherein the header is a tunnel header.

9. The method of claim 1, wherein a service engine receives the data message and directs an attribute resolving engine to identify the set of attributes associated with the service tag for the received data message, said service engine and attribute resolving engine executing on the host computer separately from any DCN.

10. The method of claim 1, wherein the set of attributes does not include L2-L4 parameters.

11. A non-transitory machine readable medium storing a program for performing a service at a host computer that executes data compute nodes (DCNs), the program comprising sets of instructions for:
receiving a data message;
identifying a service tag for the received data message;
identifying a set of attributes associated with the service tag;
using the identified set of attributes to identify a service rule;
performing a service on the data message based on the identified service rule.

12. The non-transitory machine readable medium of claim 11, wherein the set of instructions for identifying the set of attributes comprises a set of instructions for using the service tag to identify a record in a storage that stores a plurality of service tags and a set of attributes for each service tag.

13. The non-transitory machine readable medium of claim 12, wherein the set of instructions for using the identified attribute set comprises a set of instructions for using the attribute set to identify a record in a storage that stores a plurality of attribute sets and a service action parameter set for each attribute set.

14. The non-transitory machine readable medium of claim 11, wherein the set of instructions for identifying the service tag comprises a set of instructions for using a set of identifiers of the data message to identify the service tag in a storage that stores a plurality of service tags for a plurality of data message identifiers.

15. The non-transitory machine readable medium of claim 14, wherein the program further comprises a set of instructions for receiving a record that identifies the service tag for a message identifier of the data message before identifying the service tag for the received data message.

16. The non-transitory machine readable medium of claim 15, wherein the set of instructions for receiving the record comprises a set of instructions for receiving the record from a guest introspection agent of a DCN that sends the data message.

17. The non-transitory machine readable medium of claim 11, wherein the set of instructions for identifying the service tag comprises a set of instructions for extracting the service tag from a header of the data message.

18. The non-transitory machine readable medium of claim 17, wherein the header is a tunnel header.

19. The non-transitory machine readable medium of claim 11, wherein the program is performed by a service engine that directs an attribute resolving engine to identify the set of attributes associated with the service tag for the received data message, said service engine and attribute resolving engine executing on the host computer separately from any DCN.

20. The non-transitory machine readable medium of claim 11, wherein the set of attributes does not include L2-L4 parameters.

* * * * *